US006957229B1

(12) United States Patent
Dyor (10) Patent No.: US 6,957,229 B1
(45) Date of Patent: Oct. 18, 2005

(54) SYSTEM AND METHOD FOR MANAGING PERSONAL INFORMATION (76) Inventor: Matthew Graham Dyor, 1910 T St. NW. #33, Washington, DC (US) 20009

( * ) Notice: Subject to any disclaimer, the term of this patent is extended or adjusted under 35 U.S.C. 154(b) by 703 days.

(21) Appl. No.: 09/749,732

(22) Filed: Dec. 28, 2000

Related U.S. Application Data (60) Provisional application No. 60/176,622, filed on Jan. 10, 2000, provisional application No. 60/203,066, filed on May 9, 2000.

(51) Int. Cl.[7] .............................................. G06F 17/30
(52) U.S. Cl. ........................ 707/103 X; 707/1; 707/9; 709/217; 709/223
(58) Field of Search .................. 707/1–10, 100–104.1, 707/200–206; 709/206, 217–219, 223

(56) References Cited

U.S. PATENT DOCUMENTS 6,067,548 A * 5/2000 Cheng ..................... 707/103 R
6,314,425 B1 * 11/2001 Serbinis et al. ............... 707/10
6,463,461 B1 * 10/2002 Hanson et al. .............. 709/204

* cited by examiner

Primary Examiner—Shahid Alam
Assistant Examiner—Jean Bolte Fleurantin
(74) Attorney, Agent, or Firm—Matthew G. Dyor (57) ABSTRACT

A system and method for managing personal information with increased efficiency and flexibility. In one embodiment, the system includes a group website tier made up of a plurality of group website objects, a group tier made up of a plurality of group objects, a user tier made up of a plurality of user objects, a first set of relationships that define relationships between the group website objects and the group objects, and a second set of relationships that define relationships between the group objects and the user objects. Furthermore, the system preferably is configured such that each of the objects may be uniquely identified from objects on the same tier and objects on different tiers. Additionally, the first set of relationships may include a first type of relationships that define which group objects have access to each of the plurality of group websites, and a second type of relationships that define which group objects appear as content for each of the plurality of group website objects.

15 Claims, 2 Drawing Sheets

SYSTEM AND METHOD FOR MANAGING PERSONAL INFORMATION

CROSS REFERENCE TO RELATED APPLICATIONS

This application claims priority from provisional U.S. application 60/176,622 titled SYSTEM AND METHOD FOR MANAGING PERSONAL INFORMATION filed Jan. 10, 2000 and provisional U.S. application 60/203,066 titled SYSTEM AND METHOD FOR MANAGING PERSONAL INFORMATION filed May 9, 2000, both of which are incorporated herein by reference.

CD-ROM APPENDIX

This application includes a CD-ROM appendix providing a computer listing relating to the present invention. Although this computer listing is not intended to limit the scope of the claims, it is intended to serve as an exemplary implementation of various aspects of the present invention. This appendix is hereby incorporated by reference. A portion of the disclosure of this patent document contains material which is subject to copyright protection. The copyright owner has no objection to the reproduction by anyone of the patent document or the patent disclosure, as it appears as part of a complete patent document, but otherwise reserves all copyright rights.

The above-referenced CD-ROM appendix has been provided to the United States Patent and Trademark Office on two CD-R discs that are exact duplicates of each other and are labeled "Copy 1" and "Copy 2". Each of the files is IBM-PC compatable and MS-Windows compatable. The name, size in Bytes, creation date, and creation time, respectively, are provided for each file below:

| File | Size | Date | Time |
|---|---|---|---|
| 2.asp | 9177 | Sep. 24, 2000 | 16:46 |
| 2Actual.asp | 17440 | Sep. 24, 2000 | 16:46 |
| 2Actual.js | 49 | Sep. 24, 2000 | 16:53 |
| 2ActualInline.js | 621 | Sep. 24, 2000 | 16:53 |
| 2Inline.js | 480 | Sep. 24, 2000 | 16:53 |
| 2Internal.asp | 10797 | Sep. 24, 2000 | 16:46 |
| 2Internal.js | 132 | Sep. 24, 2000 | 16:53 |
| 2InternalInline.js | 691 | Sep. 24, 2000 | 16:53 |
| 44.asp | 9576 | Oct. 09, 2000 | 9:37 |
| 44.js | 58 | Oct. 09, 2000 | 9:37 |
| 44Actual.asp | 16927 | Sep. 24, 2000 | 16:46 |
| 44ActualInline.js | 508 | Sep. 24, 2000 | 16:53 |
| 44Chat.asp | 2656 | Sep. 24, 2000 | 16:47 |
| 44EventDetail.asp | 18454 | Sep. 24, 2000 | 16:46 |
| 44EventDetailInline.js | 931 | Sep. 24, 2000 | 16:54 |
| 44EventInsert.asp | 15004 | Sep. 24, 2000 | 16:47 |
| 44EventInsertInline.js | 1121 | Sep. 24, 2000 | 16:54 |
| 44EventResultList.asp | 13260 | Sep. 24, 2000 | 16:46 |
| 44EventResultListInline.js | 391 | Sep. 24, 2000 | 16:54 |
| 44EventSearch.asp | 16240 | Sep. 24, 2000 | 16:46 |
| 44EventSearchInline.js | 615 | Sep. 24, 2000 | 16:54 |
| 44EventUpdate.asp | 14926 | Sep. 24, 2000 | 16:47 |
| 44EventUpdateInline.js | 1087 | Sep. 24, 2000 | 16:54 |
| 44Inline.js | 500 | Oct. 09, 2000 | 9:37 |
| 44Internal.asp | 10692 | Sep. 24, 2000 | 16:46 |
| 44Internal.js | 132 | Sep. 24, 2000 | 16:53 |
| 44InternalInline.js | 711 | Sep. 24, 2000 | 16:53 |
| 44Results.asp | 17216 | Sep. 24, 2000 | 16:46 |
| 44ResultsInline.js | 442 | Sep. 24, 2000 | 16:53 |
| 44WebSites.asp | 12675 | Sep. 24, 2000 | 16:46 |
| 44WebSitesInline.js | 359 | Sep. 24, 2000 | 16:54 |
| 55.asp | 9180 | Oct. 09, 2000 | 9:43 |
| 55.js | 58 | Oct. 09, 2000 | 9:44 |
| 55Inline.js | 478 | Oct. 09, 2000 | 9:44 |
| Accept.asp | 15487 | Sep. 24, 2000 | 16:49 |
| Accept2.asp | 17404 | Sep. 26, 2000 | 17:28 |
| Accept2Inline.js | 279 | Sep. 24, 2000 | 16:56 |
| AcceptAction.asp | 9974 | Sep. 24, 2000 | 16:49 |
| AcceptAction2.asp | 13686 | Sep. 28, 2000 | 7:42 |
| AcceptAction2.js | 100 | Sep. 28, 2000 | 7:42 |
| AcceptAction2Inline.js | 686 | Sep. 28, 2000 | 7:42 |
| AcceptActionInline.js | 313 | Sep. 24, 2000 | 16:55 |
| AcceptInline.js | 434 | Sep. 24, 2000 | 16:55 |
| AdminOnlyDetail.asp | 15282 | Oct. 01, 2000 | 8:22 |
| AdminOnlyDetailInline.js | 91 | Sep. 24, 2000 | 16:55 |
| AutoInvite.asp | 10912 | Sep. 24, 2000 | 16:50 |
| AutoInvite.js | 85 | Sep. 24, 2000 | 16:55 |
| AutoInviteInline.js | 522 | Sep. 24, 2000 | 16:55 |
| azazoo ninja training.html | 207 | Sep. 26, 2000 | 17:30 |
| azazoo3_IE4.css | 8778 | Dec. 09, 2000 | 18:22 |
| azazoo3_NAV4Layer.css | 43350 | Dec. 09, 2000 | 18:22 |
| azazoo3GlobalClient.js | 3 | Dec. 09, 2000 | 18:22 |
| Client_Gen_3.0_Recordset.js | 7904 | Dec. 09, 2000 | 18:22 |
| CommunityAccept.asp | 18492 | Oct. 01, 2000 | 8:44 |
| CommunityAcceptAction.asp | 13938 | Sep. 24, 2000 | 16:51 |
| CommunityAcceptActionInline.js | 463 | Sep. 24, 2000 | 16:56 |
| CommunityAcceptInline.js | 301 | Sep. 24, 2000 | 16:56 |
| CommunityInvite.asp | 11581 | Sep. 24, 2000 | 16:51 |
| CommunityInvite.js | 93 | Sep. 24, 2000 | 16:56 |
| CommunityInviteInline.js | 596 | Sep. 24, 2000 | 16:56 |
| CommunityPendingInvitations.as | 15844 | Sep. 24, 2000 | 16:51 |
| CommunityPendingInvitationsInl | 462 | Sep. 24, 2000 | 16:56 |
| CommunityReject.asp | 14337 | Sep. 24, 2000 | 16:52 |
| CommunityRejectAction.asp | 13924 | Sep. 24, 2000 | 16:52 |
| CommunityRejectActionInline.js | 459 | Sep. 24, 2000 | 16:56 |
| CommunityRejectInline.js | 412 | Sep. 24, 2000 | 16:56 |
| CommunityRemove.asp | 16645 | Sep. 24, 2000 | 16:52 |
| CommunityRemoveAction.asp | 9721 | Sep. 24, 2000 | 16:52 |
| CommunityRemoveActionInline.js | 265 | Sep. 24, 2000 | 16:56 |
| CommunityRemoveInline.js | 412 | Sep. 24, 2000 | 16:56 |
| CommunityRemoveMe.asp | 17111 | Sep. 24, 2000 | 16:52 |
| CommunityRemoveMeAction.asp | 9717 | Sep. 24, 2000 | 16:52 |
| CommunityRemoveMeActionInline | 265 | Sep. 24, 2000 | 16:56 |
| CommunityRemoveMeInline.js | 400 | Sep. 24, 2000 | 16:56 |
| CommunityRevoke.asp | 13195 | Sep. 24, 2000 | 16:52 |
| CommunityRevokeAction.asp | 10421 | Sep. 24, 2000 | 16:52 |
| CommunityRevokeActionInline.js | 257 | Sep. 24, 2000 | 16:56 |
| CommunityRevokeInline.js | 293 | Sep. 24, 2000 | 16:56 |
| CommunitySiteDetail.asp | 15925 | Oct. 01, 2000 | 8:48 |
| CommunitySiteDetailInline.js | 121 | Sep. 24, 2000 | 16:55 |
| CommunitySites.asp | 30134 | Oct. 09, 2000 | 11:52 |
| CommunitySites.js | 237 | Sep. 24, 2000 | 16:55 |
| CommunitySites.txt | 24257 | Sep. 26, 2000 | 17:28 |
| CommunitySitesInline.js | 916 | Sep. 24, 2000 | 16:55 |
| ConceptsDetail1.asp | 22847 | Sep. 24, 2000 | 16:48 |
| ConceptsDetail1Inline.js | 665 | Sep. 24, 2000 | 16:54 |
| ConceptsInsert1.asp | 19718 | Sep. 24, 2000 | 16:48 |
| ConceptsInsert1Inline.js | 761 | Sep. 24, 2000 | 16:54 |
| ConceptsResultList1.asp | 19017 | Sep. 24, 2000 | 16:48 |
| ConceptsResultList1Inline.js | 285 | Sep. 24, 2000 | 16:54 |
| ConceptsSearch1.asp | 20443 | Sep. 24, 2000 | 16:48 |
| ConceptsSearch1Inline.js | 301 | Sep. 24, 2000 | 16:54 |
| ConceptsUpdate1.asp | 20070 | Sep. 24, 2000 | 16:48 |
| ConceptsUpdate1Inline.js | 761 | Sep. 24, 2000 | 16:54 |
| ContactInformation.asp | 7382 | Sep. 24, 2000 | 16:48 |
| ContactInformationInline.js | 214 | Sep. 24, 2000 | 16:54 |
| CSC201.asp | 10282 | Sep. 24, 2000 | 16:49 |
| CSC201.js | 334 | Sep. 24, 2000 | 16:54 |
| CSC201Inline.js | 604 | Sep. 24, 2000 | 16:54 |
| Data.asp | 5753 | Sep. 24, 2000 | 16:49 |
| Data.js | 515 | Sep. 24, 2000 | 16:55 |
| DataInline.js | 230 | Sep. 24, 2000 | 16:55 |
| DBChkBox.js | 751 | Dec. 09, 2000 | 18:22 |
| DBCommon.js | 2494 | Dec. 09, 2000 | 18:22 |
| DBCookieObj.js | 1553 | Dec. 09, 2000 | 18:22 |
| DBEdtBox.js | 1798 | Dec. 09, 2000 | 18:22 |
| DBForm.js | 1945 | Dec. 09, 2000 | 18:22 |
| DBFrmBtn.js | 541 | Dec. 09, 2000 | 18:22 |
| DBHiddenObj.js | 519 | Nov. 11, 2000 | 12:09 |
| DBImgBtn.js | 3710 | Dec. 08, 2000 | 10:12 |
| DBLstBox.js | 4982 | Nov. 11, 2000 | 12:08 |
| DBRadBtn.js | 709 | Sep. 24, 2000 | 16:56 |
| DBRelPos.js | 1085 | Dec. 09, 2000 | 18:22 |
| DBScrTxt.js | 1000 | Sep. 24, 2000 | 16:54 |

-continued

| File | Size | Date | Time |
|---|---|---|---|
| DC.asp | 8709 | Oct. 05, 2000 | 8:57 |
| DC.js | 2501 | Oct. 05, 2000 | 8:57 |
| DCInline.js | 573 | Oct. 05, 2000 | 8:57 |
| DCPlaces.asp | 19821 | Oct. 12, 2000 | 13:07 |
| DCPlacesDetail.asp | 15315 | Oct. 04, 2000 | 18:22 |
| DCPlacesInline.js | 430 | Oct. 12, 2000 | 12:58 |
| Demo.asp | 11885 | Sep. 28, 2000 | 7:42 |
| Demo.js | 55 | Sep. 28, 2000 | 7:42 |
| DemoInline.js | 537 | Sep. 28, 2000 | 7:42 |
| Denver.asp | 8725 | Oct. 12, 2000 | 12:58 |
| Denver.js | 2501 | Oct. 12, 2000 | 12:58 |
| DenverInline.js | 573 | Oct. 12, 2000 | 12:58 |
| DenverPlaces.asp | 19845 | Oct. 12, 2000 | 13:09 |
| DenverPlacesDetail.asp | 13937 | Oct. 12, 2000 | 12:58 |
| DenverPlacesDetailInline.js | 220 | Oct. 12, 2000 | 12:58 |
| DenverPlacesInline.js | 430 | Oct. 12, 2000 | 12:58 |
| Dyor.asp | 11356 | Nov. 11, 2000 | 12:08 |
| Dyor.js | 617 | Nov. 11, 2000 | 12:09 |
| dyordata.htm | 13247 | Sep. 28, 2000 | 9:32 |
| dyordata.html | 17517 | Sep. 28, 2000 | 9:27 |
| DyorInline.js | 720 | Nov. 11, 2000 | 12:09 |
| Explanation.asp | 6487 | Sep. 27, 2000 | 10:03 |
| Explanation.html | 6460 | Sep. 27, 2000 | 10:03 |
| External.asp | 16297 | Dec. 08, 2000 | 12:41 |
| External.js | 598 | Dec. 08, 2000 | 12:41 |
| ExternalInline.js | 831 | Dec. 08, 2000 | 12:41 |
| form.html | 4768 | Sep. 26, 2000 | 17:30 |
| formpost.asp | 215 | Dec. 10, 2000 | 22:41 |
| GenericChat.asp | 2714 | Sep. 24, 2000 | 16:50 |
| GenericEventDetail.asp | 17956 | Nov. 03, 2000 | 12:47 |
| GenericEventDetail.js | 273 | Oct. 21, 2000 | 16:35 |
| GenericEventDetailInline.js | 852 | Oct. 21, 2000 | 16:35 |
| GenericEventInsert.asp | 17956 | Nov. 03, 2000 | 12:44 |
| GenericEventInsert.js | 98 | Oct. 09, 2000 | 11:28 |
| GenericEventInsertInline.js | 1231 | Oct. 09, 2000 | 11:28 |
| GenericEventResultList.asp | 20368 | Oct. 09, 2000 | 7:48 |
| GenericEventResultListInline.j | 599 | Sep. 24, 2000 | 16:55 |
| GenericEventSearch.asp | 16778 | Sep. 24, 2000 | 16:50 |
| GenericEventSearchInline.js | 615 | Sep. 24, 2000 | 16:55 |
| GenericEventUpdate.asp | 16753 | Nov. 03, 2000 | 12:44 |
| GenericEventUpdate.js | 51 | Oct. 09, 2000 | 11:28 |
| GenericEventUpdateInline.js | 1018 | Oct. 09, 2000 | 11:28 |
| GenericWebSites.asp | 15193 | Sep. 24, 2000 | 16:50 |
| GenericWebSitesInline.js | 359 | Sep. 24, 2000 | 16:55 |
| Help.asp | 14717 | Sep. 24, 2000 | 16:49 |
| HelpInline.js | 339 | Sep. 24, 2000 | 16:55 |
| HelpResults.asp | 5543 | Sep. 24, 2000 | 16:52 |
| HelpResultsInline.js | 97 | Sep. 24, 2000 | 16:56 |
| IIS__Gen__3.0__ConnectionPool.js | 1092 | Dec. 09, 2000 | 18:22 |
| IIS__Gen__3.0__Recordset.js | 33321 | Dec. 09, 2000 | 18:22 |
| Index.asp | 15629 | Dec. 08, 2000 | 10:11 |
| Index.js | 2778 | Dec. 08, 2000 | 10:12 |
| IndexInline.js | 948 | Dec. 08, 2000 | 10:12 |
| Invite.asp | 14753 | Sep. 24, 2000 | 16:50 |
| Invite.js | 294 | Sep. 24, 2000 | 16:55 |
| InviteInline.js | 998 | Sep. 24, 2000 | 16:55 |
| JavaScriptDayNight__V10__30.js | 1144 | Dec. 08, 2000 | 10:12 |
| jotme.asp | 10767 | Oct. 12, 2000 | 6:46 |
| jotme.js | 334 | Oct. 12, 2000 | 6:46 |
| jotmeInline.js | 604 | Oct. 12, 2000 | 6:46 |
| KPMGChix.asp | 10949 | Sep. 26, 2000 | 17:28 |
| KPMGChix.js | 334 | Sep. 24, 2000 | 16:54 |
| KPMGChixInline.js | 604 | Sep. 24, 2000 | 16:54 |
| LogOut.asp | 14168 | Sep. 24, 2000 | 16:52 |
| LogOutInline.js | 511 | Sep. 24, 2000 | 16:56 |
| MemberIDNumber.asp | 9820 | Sep. 24, 2000 | 16:49 |
| MemberIDNumber.js | 2212 | Sep. 24, 2000 | 16:55 |
| MemberIDNumberInline.js | 508 | Sep. 24, 2000 | 16:55 |
| MemberIDSearch.asp | 11958 | Sep. 24, 2000 | 16:49 |
| MemberIDSearch.js | 5645 | Sep. 24, 2000 | 16:55 |
| MemberIDSearchInline.js | 543 | Sep. 24, 2000 | 16:55 |
| MkOptnFmRecordset.js | 2054 | Nov. 11, 2000 | 12:08 |
| NewGroupExplain.asp | 9282 | Sep. 24, 2000 | 16:50 |
| NewGroupExplainInline.js | 113 | Sep. 24, 2000 | 16:55 |
| NewMember.asp | 10442 | Oct. 24, 2000 | 8:39 |
| NewMember.js | 2596 | Oct. 24, 2000 | 8:40 |
| NewMemberExplain.asp | 19139 | Sep. 28, 2000 | 7:42 |
| NewMemberExplain.js | 2212 | Sep. 28, 2000 | 7:42 |
| NewMemberExplainInline.js | 379 | Sep. 28, 2000 | 7:42 |
| NewMemberInline.js | 681 | Oct. 24, 2000 | 8:40 |
| OrderForm.asp | 25326 | Oct. 09, 2000 | 14:34 |
| OrderFormInline.js | 2413 | Oct. 09, 2000 | 14:34 |
| Page43.asp | 11885 | Dec. 02, 2000 | 17:47 |
| Page43Inline.js | 259 | Dec. 02, 2000 | 17:48 |
| Page44.asp | 6404 | Dec. 03, 2000 | 12:04 |
| Page44Inline.js | 83 | Dec. 02, 2000 | 17:48 |
| palm.asp | 12608 | Nov. 20, 2000 | 15:01 |
| Palm.html | 179 | Sep. 26, 2000 | 17:28 |
| PalmContacts.html | 4343 | Sep. 24, 2000 | 16:49 |
| PatentNinja.asp | 26633 | Dec. 11, 2000 | 23:36 |
| PatentNinja.js | 598 | Dec. 09, 2000 | 18:22 |
| PatentNinjaInline.js | 1013 | Dec. 09, 2000 | 18:22 |
| PendingInvitations.asp | 15997 | Sep. 24, 2000 | 16:50 |
| PendingInvitationsInline.js | 430 | Sep. 24, 2000 | 16:56 |
| PreviewSite.asp | 24087 | Sep. 24, 2000 | 16:50 |
| PreviewSite.js | 237 | Sep. 24, 2000 | 16:55 |
| PreviewSiteInline.js | 916 | Sep. 24, 2000 | 16:55 |
| Pryor.asp | 10767 | Oct. 09, 2000 | 14:22 |
| Pryor.js | 334 | Oct. 09, 2000 | 14:23 |
| PryorInline.js | 604 | Oct. 09, 2000 | 14:23 |
| QuiCommunityRelationshipsDetai | 20969 | Sep. 24, 2000 | 16:48 |
| QuiCommunityRelationshipsDetai | 825 | Sep. 24, 2000 | 16:54 |
| QuiCommunityRelationshipsInser | 18583 | Sep. 24, 2000 | 16:48 |
| QuiCommunityRelationshipsInser | 719 | Sep. 24, 2000 | 16:54 |
| QuiCommunityRelationshipsParam | 16900 | Sep. 24, 2000 | 16:48 |
| QuiCommunityRelationshipsParam | 323 | Sep. 24, 2000 | 16:54 |
| QuiCommunityRelationshipsResul | 21533 | Sep. 26, 2000 | 17:28 |
| QuiCommunityRelationshipsResul | 575 | Sep. 24, 2000 | 16:54 |
| QuiCommunityRelationshipsSearc | 22517 | Sep. 24, 2000 | 16:47 |
| QuiCommunityRelationshipsSearc | 571 | Sep. 24, 2000 | 16:54 |
| QuiCommunityRelationshipsUpdat | 18703 | Sep. 24, 2000 | 16:48 |
| QuiCommunityRelationshipsUpdat | 719 | Sep. 24, 2000 | 16:54 |
| QuiDetail.asp | 29254 | Oct. 04, 2000 | 8:37 |
| QuiDetailInline.js | 649 | Oct. 04, 2000 | 8:38 |
| QuiInsert.asp | 29451 | Oct. 04, 2000 | 8:37 |
| QuiInsert.js | 6111 | Oct. 04, 2000 | 8:38 |
| QuiInsertInline.js | 1891 | Oct. 04, 2000 | 8:38 |
| QuiRelationshipInsert1.asp | 18169 | Sep. 24, 2000 | 16:47 |
| QuiRelationshipInsert1Inline.j | 611 | Sep. 24, 2000 | 16:54 |
| QuiRelationshipResultList1.asp | 18597 | Sep. 26, 2000 | 17:28 |
| QuiRelationshipResultList1Inli | 291 | Sep. 24, 2000 | 16:54 |
| QuiRelationshipSearch1.asp | 22152 | Sep. 24, 2000 | 16:47 |
| QuiRelationshipSearch1Inline.j | 433 | Sep. 24, 2000 | 16:54 |
| QuiRelationshipUpdate1.asp | 18576 | Sep. 24, 2000 | 16:47 |
| QuiRelationshipUpdate1Inline.j | 611 | Sep. 24, 2000 | 16:54 |
| QuiResult.asp | 23442 | Oct. 04, 2000 | 8:42 |
| QuiResultInline.js | 317 | Oct. 04, 2000 | 8:38 |
| QuiSearch.asp | 22493 | Oct. 04, 2000 | 8:37 |
| QuiSearchInline.js | 501 | Oct. 04, 2000 | 8:38 |
| QuiUpdate.asp | 31119 | Oct. 09, 2000 | 9:43 |
| QuiUpdate.js | 6128 | Oct. 09, 2000 | 9:44 |
| QuiUpdateInline.js | 1990 | Oct. 09, 2000 | 9:44 |
| Reject.asp | 16035 | Sep. 24, 2000 | 16:51 |
| RejectAction.asp | 13687 | Sep. 24, 2000 | 16:51 |
| RejectAction.js | 100 | Sep. 24, 2000 | 16:56 |
| RejectActionInline.js | 686 | Sep. 24, 2000 | 16:56 |
| RejectInline.js | 376 | Sep. 24, 2000 | 16:56 |
| Removal.asp | 15883 | Sep. 24, 2000 | 16:51 |
| RemovalInline.js | 99 | Sep. 24, 2000 | 16:56 |
| Remove.asp | 16441 | Sep. 24, 2000 | 16:51 |
| RemoveAction.asp | 9222 | Sep. 24, 2000 | 16:51 |
| RemoveActionInline.js | 247 | Sep. 24, 2000 | 16:56 |
| RemoveInline.js | 372 | Sep. 24, 2000 | 16:56 |
| RemoveMe.asp | 16591 | Sep. 24, 2000 | 16:51 |
| RemoveMeAction.asp | 9218 | Sep. 24, 2000 | 16:51 |
| RemoveMeActionInline.js | 247 | Sep. 24, 2000 | 16:56 |
| RemoveMeInline.js | 376 | Sep. 24, 2000 | 16:56 |
| Revoke.asp | 16462 | Sep. 24, 2000 | 16:51 |
| RevokeAction.asp | 9754 | Sep. 24, 2000 | 16:51 |
| RevokeActionInline.js | 257 | Sep. 24, 2000 | 16:56 |
| RevokeInline.js | 372 | Sep. 24, 2000 | 16:56 |
| Sponsors.asp | 5884 | Oct. 09, 2000 | 9:22 |
| testretreive.asp | 667 | Dec. 10, 2000 | 22:41 |
| UpdatePl.asp | 19773 | Oct. 01, 2000 | 16:06 |
| UpdatePl.js | 13726 | Oct. 01, 2000 | 16:06 |
| UpdatePlInline.js | 1280 | Oct. 01, 2000 | 16:06 |
| UpdateWebsite.asp | 14852 | Sep. 24, 2000 | 16:50 |
| UpdateWebsite.js | 7291 | Sep. 24, 2000 | 16:55 |

-continued

| | | | |
|---|---|---|---|
| UpdateWebsiteInline.js | 799 | Sep. 24, 2000 | 16:55 |
| Upload.asp | 170 | Nov. 04, 2000 | 9:47 |
| Upload.html | 454 | Nov. 04, 2000 | 9:25 |
| UserInsert.asp | 11998 | Oct. 09, 2000 | 8:30 |
| UserInsert.js | 16482 | Oct. 09, 2000 | 8:31 |
| UserInsertInline.js | 1119 | Oct. 09, 2000 | 8:31 |
| ViewWebsites.asp | 21257 | Nov. 11, 2000 | 12:08 |
| ViewWebsites.js | 190 | Nov. 11, 2000 | 12:09 |
| ViewWebsitesInline.js | 833 | Nov. 11, 2000 | 12:09 |
| Websites.html | 2241 | Sep. 24, 2000 | 16:46 |
| WebsitesInline.js | 112 | Sep. 24, 2000 | 16:53 |
| xyxyxy.asp | 9207 | Sep. 24, 2000 | 16:48 |
| xyxyxyActual.asp | 15563 | Sep. 24, 2000 | 16:48 |
| xyxyxyActualInline.js | 398 | Sep. 24, 2000 | 16:54 |
| xyxyxyInline.js | 480 | Sep. 24, 2000 | 16:54 |
| xyxyxyInternal.asp | 10832 | Sep. 24, 2000 | 16:48 |
| xyxyxyInternal.js | 132 | Sep. 24, 2000 | 16:54 |
| xyxyxyInternalInline.js | 691 | Sep. 24, 2000 | 16:54 |
| YourContacts.asp | 23896 | Oct. 09, 2000 | 12:23 |
| YourContacts.js | 237 | Sep. 24, 2000 | 16:55 |
| YourContactsInline.js | 978 | Sep. 24, 2000 | 16:55 |
| YourWebSiteWebSiteInsert.asp | 15698 | Sep. 24, 2000 | 16:52 |
| YourWebSiteWebSiteInsert.js | 95 | Sep. 24, 2000 | 16:56 |
| YourWebSiteWebSiteInsertInline | 1056 | Sep. 24, 2000 | 16:56 |
| YourWebSiteWebSiteResult2.asp | 18253 | Sep. 24, 2000 | 16:52 |
| YourWebSiteWebSiteResult2Inlin | 424 | Sep. 24, 2000 | 16:56 |
| YourWebSiteWebSiteSearch.asp | 16635 | Sep. 24, 2000 | 16:52 |
| YourWebSiteWebSiteSearchInline | 583 | Sep. 24, 2000 | 16:56 |
| YourWebSiteWebSiteUpdate.asp | 19603 | Sep. 24, 2000 | 16:52 |
| YourWebSiteWebSiteUpdate.js | 212 | Sep. 24, 2000 | 16:56 |
| YourWebSiteWebSiteUpdateInline | 1230 | Sep. 24, 2000 | 16:56 |

BACKGROUND OF THE INVENTION

1. Field of the Invention

The present invention relates to a system and method for managing personal information, and more particularly to a system and method for managing personal information wherein users have increased control of their personal information and administrators have increased efficiency of administration.

2. Description of Related Art

A number of conventional systems and methods may be used for communicating personal information. For example, one system enables a user to establish relationships between users, such that the users can share personal information. However, such systems do not allow a user to establish a relationship with a plurality of users simultaneously. Accordingly, such systems place an administrative burden on all of the users.

Some conventional systems allow a number of members to share personal information with a number of group members. However, such systems do not allow a user to update a number of different groups by updating a single user object, such as a single user record.

SUMMARY OF THE INVENTION

Accordingly, the present invention is directed to a system and method for managing personal information that substantially obviates one or more of the problems due to the limitations and disadvantages of the related art.

Accordingly, the present invention is directed to a personal information management system and method that substantially obviates one or more of the problems due to limitations and disadvantages of the related art.

An object of the present invention is to provide a system and method for managing personal information with increased efficiency and flexibility.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

In one embodiment, the present invention comprises a system for managing personal information including a group website tier comprising a plurality of group website objects, a group tier comprising a plurality of group objects, user tier comprising a plurality of user objects, a first set of relationships that define relationships between the group website objects and the group objects, and a second set of relationships that define relationships between the group objects and the user objects.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, examples of which are illustrated in the drawings.

Figure 1:
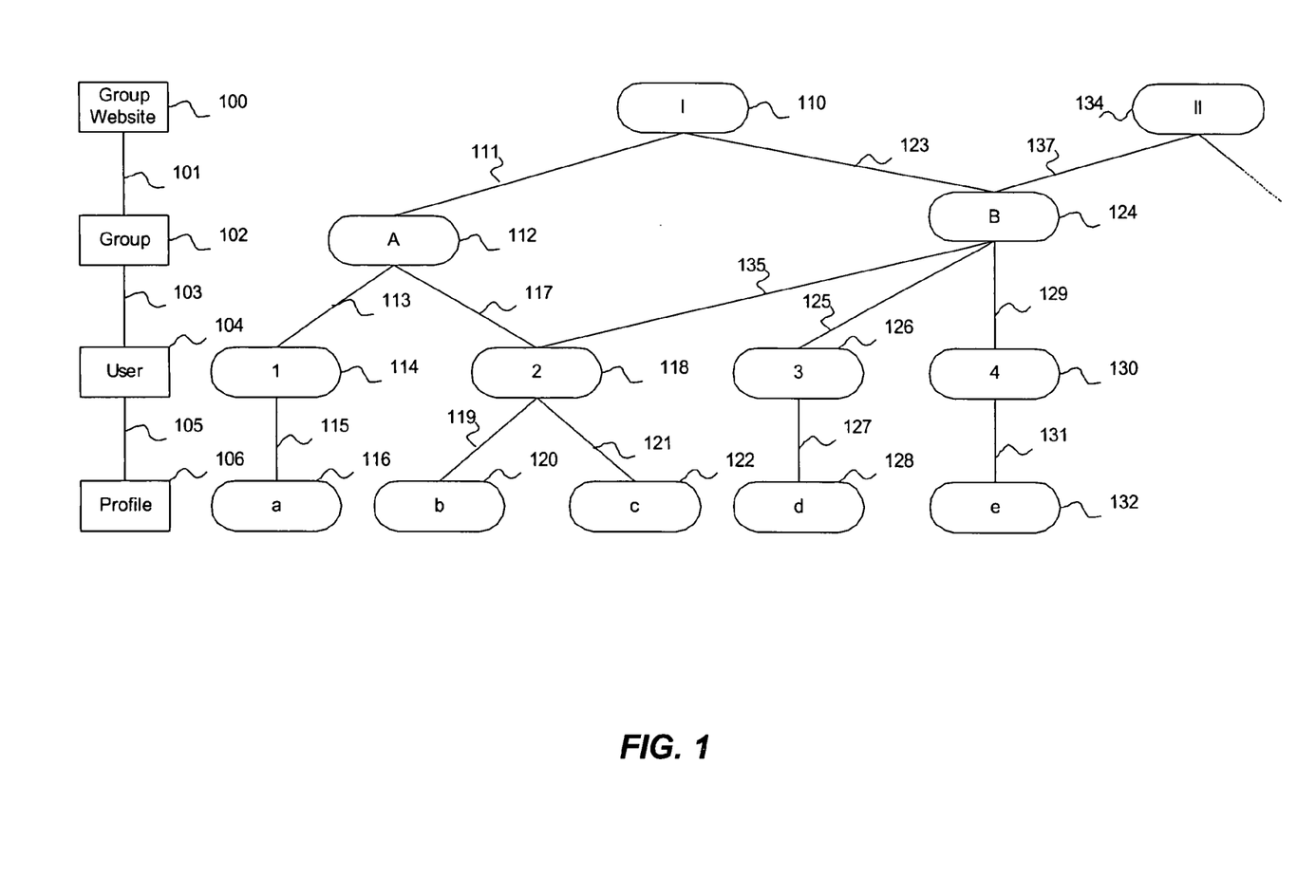
FIG. 1 shows a logical block diagram in accordance with the present invention.

In a preferred embodiment, the present invention may be implemented using a four-tier structure, as shown in FIG. 1. The four tiers are group website tier 100, group tier 102, user tier 104, and profile tier 106. Objects within each of these tiers may have relationships with other objects on the same tier and objects on different tiers. Objects in group website tier 100 may be referred to as group website objects; objects in group tier 102 may be referred to as group objects; objects in the user tier 104 may be referred to as user objects, and objects within the profile tier 106 may be referred to as profile objects. In one embodiment, profile objects have many to one relationships with user objects, user objects have many to many relationships with group objects, and group objects have many to many relationships with group website objects. Additionally, in one embodiment, objects may have an administrator group object, such that members of the administrator group object have the ability to modify relationships and/or attributes associated with the object. Each of these objects and relationships will be explained in greater detail below.

Objects 116, 120, 122, 128, and 132 are examples of profile objects. Profile objects comprise personal information relating to a particular user object. For example, profiles may include name, address, phone numbers, or other personal information. A user may create new types of personal information by creating a new data type name:value pair (e.g., a label for the special data type and a special data type content). The profile object may additionally comprise an object name assigned by the profile object administrator. Additionally, a profile object may include a profile type, such as a work type, a personal type, a public type, and other types. These profile types may be used by a group object administrator in limiting the type of profile with which a member can accept an invitation. Additionally, profile names may be created by a user and not made available to any other users.

In a preferred embodiment, a user object has a plurality of different profiles. Some of these profiles may provide different views of the same personal information (e.g., a "High Priority Work" profile may include a cell phone number while a "Low Priority Work" may have all of the same information except not provide a cell phone number) or provide different types of information (e.g., a "Personal" profile may include a name, an address, and a phone number, whereas a lacrosse profile may include a team position, a team number, and a school year).

Objects 114, 118, 126, and 130 are examples of user objects. User objects comprise a unique identifier and a password. A user object may additionally comprise an additional unique identifier. For example, a first unique identifier may be assigned to a user by the system when the user object is created, and a second unique identifier may be selected by the active user. For purposes of this application, a user who causes a creation, modification, or deletion of a particular object may be referred to as the active user for that particular object creation, modification, or deletion. The active user may be a user or a technical representation of a user (e.g., a session identifier, a cookie, or other software and/or hardware that uniquely corresponds to a user). As will be explained more fully below, an object may have many active users over its life cycle, however each creation, modification, or deletion for an object has only one active user.

User objects may additionally comprise a user object type, such as a conventional type, a child type, a dependant type, or other type of object. User objects may additionally comprise one or more verification fields. In a preferred embodiment, the verification fields may not be updated by a user associated with a user object to which the verification fields relate. For example, a user object may comprise a user verification field that indicates that a user has been confirmed to exist by a third-party. The third-party may review, for example, a current drivers license and passport to verify that the user is who the user purports to be during registration. Similarly, the third-party may indicate the duration of time that the user has been verified by the third-party. In a preferred embodiment, each user has a single user object and one or more profiles. The system may uniquely identify a user based on a password and a unique identifier received from an authentication page, a cookie, and other types of methods.

In one embodiment, a user object may comprise tiers of passwords. For example, a user object may have a first password that is a low security password and a second password that is a high security password. The low security password may be provided with limited personal information access and modification rights, whereas the high security password may be provided with all of the access and modification rights available to the user. A user may determine what set of rights are available with each of the passwords, such that once a user logs in with a password the user may perform any of the functions available for that password. In a preferred embodiment, a first password has a first set of rights, and a second password that is a higher security password has the first set of rights and an additional set of rights, which together comprise a second set of rights. Additional tiers of passwords may be added in this manner.

A benefit of having tiers of passwords is that a low security password may be used at a non-trusted terminal device that has limited rights, and a higher security password can be used only at trusted terminal devices.

In one embodiment, physical objects may be used in addition to or in lieu of a text password. Physical objects may include a key having a unique identifier, a fingerprint, an eye pattern, and other physical objects that may uniquely identify an individual. A unique identifier associated with a physical object may be stored as part of a user object.

Objects 112 and 124 are examples of group objects. Group objects may comprise a unique identifier and a group name. Additionally, the group object may comprise a group type, such as a flexible group attribute or other type of group attribute. The membership of a flexible group objects may change over time, whereas the membership of a non-flexible group object may not change after it is created. The meaning of each of these types and attributes is explained in greater detail below. In a preferred embodiment, an identity group object is a non-flexible group object having a relationship with a single user object, said single user being the active user who created the object. In a preferred embodiment, the identity group object serves as its own administrator group object (e.g., if the identity group object has a unique identifier of 1014, the administrator group object identifier is also 1014). Preferably, the identity group object is created automatically by the system upon the creation of a user object based on input provided by a user. Additionally, the system preferably automatically creates a relationship between the user object and the identity group object upon creation of the identity group object. Relationships are disclosed in greater detail below. In one embodiment, a group object may comprise an attribute that may be used to determine what information is requested by the group object. For example, the group object may be limited to providing name, address and phone number of its members when its members become content members of a group website, as explained in greater detail below. Furthermore, in one embodiment, a group object may comprise an attribute that may be used to determine a type of profile object with which a user may accept an invitation. For example, a group object may require that in order to accept an invitation, a user must accept an invitation with a profile object identified as a work profile object.

Objects 110 and 134 are examples of group website objects. A group website object may comprise a group website name and a unique identifier. Additionally, the group website may comprise various visual presentation attributes, such as the look-and-feel of the website. For example, the group website object may comprise a font-type, a background color, a graphic, an advertisement, and other visual presentation parameters. Additionally, the group website object may comprise an extra functionality indicator. For example, the extra functionality may indicate whether a group website includes a group website calendar, a group website chat room, a group communication function (e.g., email all members of content members for the group website), a member-to-member directions function (e.g., determine directions from a selected address of an authenticated user to an address of a member of a content member based on personal information of profile objects), or other types of group website functionality (e.g., the types of functionality disclosed in Provisional U.S. Patent Application 60/203,066 and/or the computer listing provided as an appendix to the present application).

Additionally, a group website object may comprise an attribute that identifies a type of group website object. For example, the group object website may be identified as a contact group website, in which case the only access member is the identity function for the group object's active user (e.g., the active user that created the group website object). Similarly, the group website object may be identified as a matching group, in which case the access group and the content group are the same group.

In one embodiment, a group website object also includes an attribute that determines which personal information the group website object causes to be displayed by the personal information server, as explained in greater detail below. In one embodiment, a group website may additionally comprise an external identifier if the group website administrator is using the group website to control access to an external virtual and/or physical location. For example, the external identifier may include a web address for a web page having no personal information. In this way, a web page administrator may independently manage the content of the web page without use of the personal information server while still using the personal information server to control access to the web page. Similarly, as described in greater detail below, the present invention may be used to control access to a physical location, in which case the external identifier may be used to uniquely identify the terminal device from which access requests are received and the terminal device by which access requests are granted. In one embodiment, these external identifiers may be Internet Protocol addresses for terminal devices.

In a preferred embodiment, a control panel attribute of a group website may determine the functions that are made available via a control panel. For example, the control panel attribute may indicate that the only functionality an authenticated user is able to see while viewing a group website is an update personal information function, a remove function, and a more options function. Additionally, the control panel attribute may have a dynamic value that enables an authenticated user to view those functions for which the authenticated user has completed training. For example, once a user has completed a training module relating to a particular function, a profile object managed by the system and associated with the user may be updated, and this profile object may be consulted if the user visits a group website having a dynamic control panel attribute.

In a preferred embodiment, one or more of the above types of objects may have attributes relating to the types of invitations that the object may receive. For example, an object may indicate that it shall not receive any invitations from any objects that are commercial in nature, or the object may indicate that it shall not receive any invitations from any objects unless a member of the administrative group has indicated that an invitation from the group is desired (e.g., by placing an invitation to the acceptable object and/or by placing the acceptable object's unique identifier on an "awaiting invitation" list that is consulted each time an invitation is created for the object).

Turning to the relationships between objects 101, 103, 105, objects may have relationships between other objects. Objects that have one to many relationships may include a relationship attribute within the object. Objects that have many to many relationships may include a relationship table that takes a unique identifier for a first object, a unique identifier for a second object, and a relationship value (and in some circumstances a relationship type). These relationships will be explained in greater detail below.

In one embodiment, all objects but identity group objects have an administrator group object. In a preferred embodiment, the administrator group object may be implemented as an attribute that is part of the corresponding object. This attribute may be provided during the creation of the object. In one embodiment, the default value for the administrator group object is the identity group object of the active user who created the object (e.g., the group object consisting of the member object of the active user who created the object). The administrator group object attribute may identify an administrator group for a particular object. The administrator group may be able to change the attributes associated with the particular object. Additionally, a member of the administrator group may be able to establish, modify, and/or delete relationships between the particular object and one or more other objects, as described in greater detail below. The administrator group object is preferably a group object from group tier 102.

Relationships 115, 119, 121, 127, and 131 are examples of profile object to user object relationships. Profile objects preferably have one to many relationships with users. In other words, each profile has one user and each user may have many profiles. In a preferred embodiment, when a user creates a profile, that user is automatically associated as the associated user. In one embodiment, a profile object may be associated with a user and managed by a second individual. For example, a first user may create a profile object during a complex profile creation function, which enables the first user to designate the first user or a second user as the associated user and the first user, the second user or a third user as the administrator user. If the associated user and the administrator user for a profile object may be different, the system may enable this functionality by including a relationship table between objects and profiles, wherein a first record includes a profile identifier, an associated user identifier, and an administrator user identifier.

Relationships 113, 117, 135, 125, and 129 are examples of user object to group object relationships. User objects may have many to many relationships with group objects. In one embodiment, users may be members of groups. In a preferred embodiment, a user object to group object relationship may comprise a relationship unique identifier, a user object unique identifier, and a group object identifier. In a preferred embodiment, a group object relationship additionally comprises a profile object identifier of a profile object associated with the user object. A user object that receives an invitation may accept the invitation with any profile, unless the invitation has a requirement that mandates otherwise. In one embodiment, a member of an administrative group object for a user object may change the profile object associated with the user object to group object relationship. In a preferred embodiment, a single user object may have one or more relationships with a single group object. Preferably, the profile object identifier must be different for every relationship between the same user object and group object (e.g., a profile object identifier, a user object identifier, and a group object identifier collectively form a primary key). In one embodiment, relationships between user objects and group objects may be of different types. For example, relationships may be conventional relationships, contact list relationships, new member relationships, and other types of relationships.

Relationships 111, 123, and 137 are examples of group object to group website object relationships. Group objects may have many to many relationships with group websites. In one embodiment, group objects may have different types of relationships with group objects, wherein the type of relationship determines the rights the group object has with respect to the group website. For example, group objects may be access members and/or content members of group websites. An access member group may be allowed to view a group website (or gain access to a virtual and/or physical place with which the group website has been associated, as described in greater detail below). A content member group may have the personal information of its group members displayed on the group website. In one embodiment, a group website object having no access member has no access restrictions on it (e.g., any user can view the contents without authentication), and a group website object having no content members is simply a controlled access location (e.g., the system is being used to limit access to a virtual and/or physical location, but this location does not display personal information). Other types of relationships may be available, such as an email update relationship in which group members receive emails when content from a website changes (e.g., content of a profile object of a content group member and/or a new relationship created between the group website object and the group objects and/or the group object members and their user members). These different types of relationships may be identified, for example, by placing a predetermined value in a relationship type column of a database table, by placing an XML tagged value in an XML document, or by other means.

By way of example, FIG. 1 will be explained based on how the present invention may be implemented. A user associated with user object 1 accesses an authentication page. After providing a user name and password, the system stores a unique identifier associated with the user as a session variable and presents the user with a screen. The screen includes a list of group websites to which the user is a member of an access member. Assuming that relationship 111 indicates group object A is an access member of group website I and relationship 123 indicates group object B is a content member of group website I, the screen will allow the user to access group website I. If the user has access to a limited number of group websites, the system may provide the user with a drop-down list by which the user can select the group website the user intends to visit. Additionally, the user may select group website I by typing in a unique identifier for group website I and hitting submit, searching for group website I and selecting it from a list of related group websites, or by other means. In one embodiment, after selecting group website I, a second session variable is set that indicates the user has been authorized to see the contents of group website I. Upon proceeding to a content page, the user may be presented with a list of all the profiles of all the members of all the content members. For example, the user may be presented with profile objects b, c, d, and e. Specifically, group object B has been assumed to be a content member for group website I. User objects 2, 3, and 4 are members of group object 13. Profile objects d and e must be presented, because they are the only profiles available to user objects 3 and 4. Because user object 2 has two profile objects, user object 2 may have accepted the relationship with either or both profiles. In a preferred embodiment, relationship 135 determines which of these profiles is presented. For example, if a user associated with user object 2 accepted the invitation and provided a unique identifier associated with profile object b with the acceptance, then profile object b would be made available via group website I. If, on the other hand, the user associated with user object 2 accepted the invitation and provided a unique identifier associated with profile object b and a unique identifier associated with profile object c with the acceptance, then both profile object b and c would be made available via group website I. In a preferred embodiment, if two profile objects are provided that have a same associated user object, the system may present a single profile at the group website with a control to access the additional profiles (e.g., a plus sign that, when selected, provides all of the user object's profiles). Similarly, the overlapping information from two or more profile objects relating to a single user object may be combined. For example, if a user object is the associated object for two profile objects and the first profile object provides a name, address, and work phone number while the a second profile object provides a name and cell phone number, then the system may present personal information relating to a name, address, cell phone number and work phone number for the user. This description is intended to be exemplary, and not intended to limit the scope of the invention.

Figure 2:
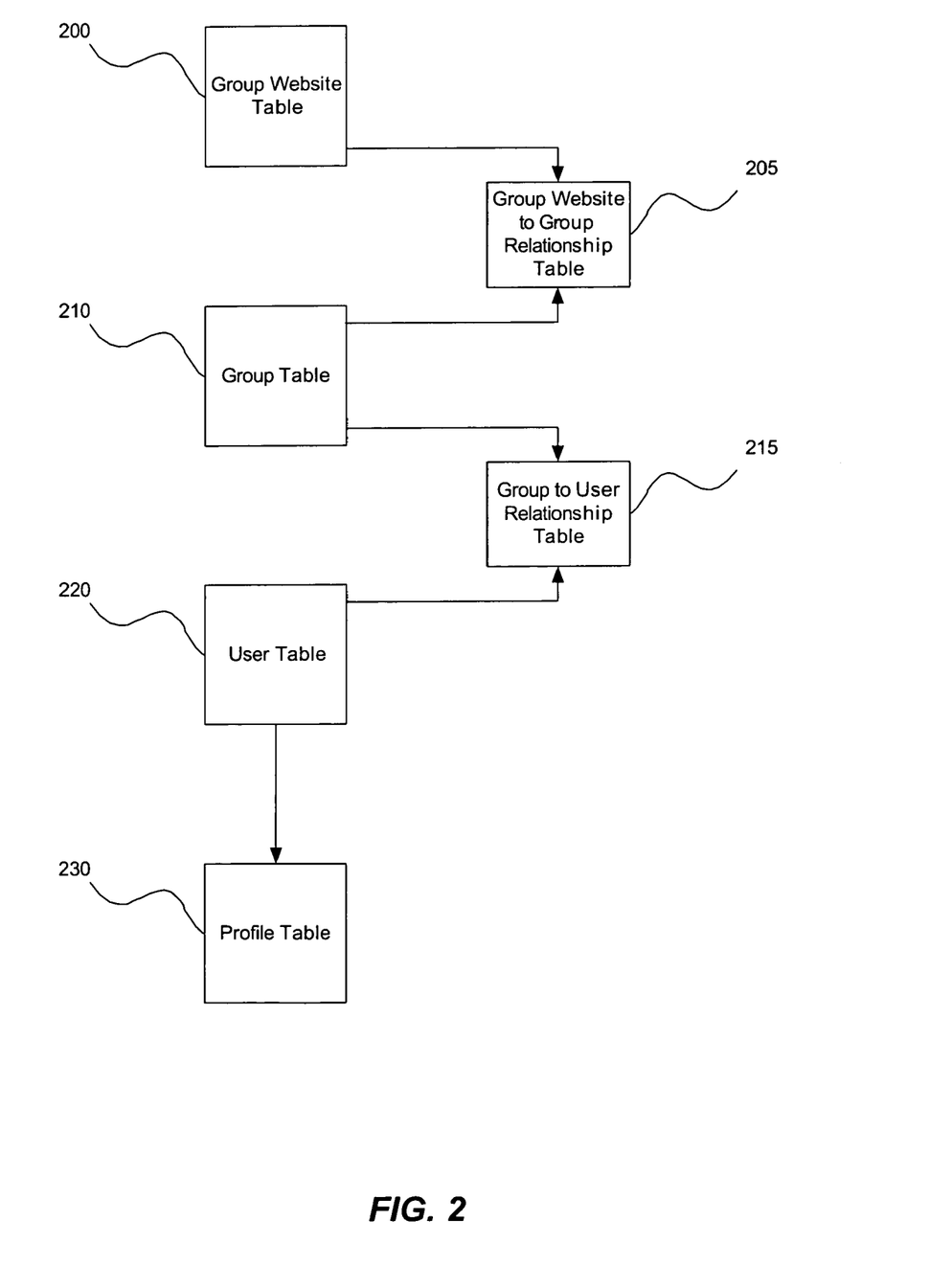
FIG. 2 shows a technical implementation in accordance with the present invention.

Turning to FIG. 2, shown is a possible technical implementation of the present invention. In one embodiment, a relational database may be used to implement the data structure disclosed in FIG. 2. For example, the present invention may be implemented using an Access database, a SQL server database, another type of relational database, or a plurality of relational databases.

Group website table 200 may comprise a plurality of columns. For example, group website table may comprise a column that uniquely identifies each of a plurality of group website object. Additionally, group website table 200 may comprise columns for each of the plurality of attributes described above with relation to the group website objects.

Group website to group relationship table 205 may comprise a relationship unique identifier, a relationship type (e.g., content or access), a group website object identifier, a group object identifier, and a relationship value (e.g., invited or 2, accepted or 1, and rejected or 2). Each group website object may have up to one relationship with each group object for each relationship type that exists between the objects (e.g., one content relationship and one access relationship).

Group table 210 may comprise a plurality of columns. For example, group website table may comprise a column that uniquely identifies each of a plurality of group website object. Additionally, group website table 200 may comprise columns for each of the plurality of attributes described above with relation to the group website objects.

Group to user relationship table 215 may comprise a relationship unique identifier, a group object identifier, a user object identifier, a profile object identifier, and a relationship value (e.g., invited or 2, accepted or 1, and rejected or 2). Additionally, there may be additional types of relationships. Each group object may have up to one relationship with each profile object for each relationship type that exists between the objects (e.g., if there is only a membership type relationship, then there can only be one relationship between each group object and each profile object, but there may be many relationships between a single group object and a single user object because each user object may have many profile objects).

User table 220 and profile table 230 may comprise a plurality of columns. For example, these tables may comprise a column that uniquely identifies each of a plurality of objects. Additionally, these tables may comprise columns for each of the plurality of attributes described above with relation to the respective objects.

In one embodiment, each of the records in each of the tables may have the same column headings. For example, the first column may be entitled "Identifier," the second column may be entitle "Name," and each of the following columns labeled with different attribute names. If each of the object types and each of the relationship types have their own table, there is no need to provide a object or relationship type. If, however, different types of relationships and/or objects share a single table, one or more of the columns must be used to identify the type of relationship and/or object the particular record describes.

In an alternative embodiment, the present invention may be implemented using a plurality of XML documents. For example, each XML document may include a type identifier (e.g., identifying the type of object or relationship defined by the XML document). Additionally, the XML document may include the attribute values tagged by the attribute names. For example, the following excerpt of an XML document may be used:

<Document>
   <DocumentType>Object</DocumentType>
   <ObjectType>GroupWebsite</ObjectType>
   <ObjectIdentifier>1234</ObjectIdentifier>
   <ObjectAdministratorGroup>2445</ObjectAdministratorGroup>
   <ObjectName>Dyor Family Web Page</ObjectName>
   . . . Additional Object Attributes . . .

</Document>

By using XML in this fashion, attributes may be added to an object and/or relationship without taking the database offline and without increasing the storage space required for objects and/or relationships that do not employ all of the additional attributes. Additionally, the data (both object and relationship data) may be exported to different computers (e.g., distributed computing), different technologies (e.g., Microsoft Outlook), different devices (e.g., cell phones and personal digital assistants), and other different types of systems. In a preferred embodiment, the export of this data may be controlled such that if an authenticated user is authorized to access data (e.g., is a member of an access member of a group website), the authenticated user may request and receive the object and relationship data an in XML compliant format relating to the group website. Similarly, object and data relationship may be transmitted based upon a predetermined condition (e.g., an on-dirty update or passage of a predetermined amount of time).

In a preferred embodiment, the present invention is implemented such that the identity group object of the active user that creates an object is that object's group administrator object. However, by accessing a complex object function, the active user may designate any group object as the administrator group object, including group objects of which the active user is or is not a member. The members of the administrator group object are responsible for inviting members to an object (e.g., inviting profile objects to user objects, user objects to group objects, and group objects to group website objects) as well as removing members from other objects. Similarly, members of the administrator group are responsible for accepting and rejecting invitations from other objects (e.g., invitations from user objects, invitations from group objects, and invitations from group website objects) as well as revoking membership from other objects. Additionally, the members of the administrator group object are responsible for updating the attributes associated with the object, as described above.

In one embodiment, all memberships are created based on a two-part rule. First, for an inviting object, any administrator group object member for the inviting object may invite other objects that are on the same tier or one tier lower to become a member of the object. Second, for an invited object, any administrator group object member for the invited object may accept or reject the invitation. In a preferred embodiment, if the invitation is accepted, any member of either administrator group (inviting object or invited object) may destroy the membership at any time. In one embodiment, these relationships may be implemented by creating a record in a database in which the unique identifier for the inviting object, the unique identifier for the invited object, and a relationship value is created when an invitation is submitted. The value of the relationship may be updated by an administrator for the invited object to either accept or reject the invitation. Once the invitation is accepted, the invited object is a member of the inviting object.

In a preferred embodiment, if the active user for the inviting group is also a member of the invited group's administrator group, the system may automatically accept the invitation. For example, assuming a first user has a user object for which the user's identity group object is the administrator. If the first user creates a new group object and invites her user object to the group object, the system may automatically accept the invitation. In a preferred embodiment, once there is a rejection of an invitation or a revocation of a membership between two objects, no further invitations having the same type may be created between the two objects.

In one embodiment, the attributes of an object may modify the membership creation scheme associated with the object. For example, a flexible group can have members added to it, whereas a non-flexible group is fixed once it is created (e.g., no members may be added). A child user object may have a different type of acceptance scheme. For example, a child user object may have an acceptance scheme in which a child user object can receive, reject and accept invitations to join group objects. If a rejection is indicated, the rejection may be implemented by the system as described above. If the invitation is accepted, the invitation may be forwarded to a parent user object associated with the child user object. The parent may then accept or reject the invitation on behalf of the child. In a preferred embodiment, in order for a parent user object to be associated with a child user object, a third-party may be required to verify the relationship in accordance with the Children's Online Privacy Protection Act (COPPA). The parent user object may be given the same access rights as the child user object, thereby enabling a parent to monitor the group websites to which a child has access.

Some object attributes may be changed at any time by a member of the object's administrator group, such as the name of the object and the description of the object. Other object attributes may not be changed by a member of the object's administrator group, such as the flexible attribute. In one embodiment, a group may be changed from flexible to non-flexible, but may not be changed from non-flexible to flexible. Additionally, some object attributes may change automatically over time. For example, the attribute that identifies a user object as a child user object may automatically change after a user associated with the user object achieves a certain age.

In one embodiment, the present invention may be implemented using automatic relationship and object creation, collectively referred to as automation, based upon a selected or invoked function. For example, the present invention may have automation for contact lists, matching groups, and new member creation. Each of these automation functions will be explained in greater detail below.

Contact list automation may be implemented in two steps. First, when a user object is created, an identity group object may be created and the user object is established as the only member of the identity group object. Additionally, a group website is created and the identity group object is established as the only access member of the group website. Second, when a contact list invitation function is invoked (e.g., an "Invite Contact" page is accessed, a user object unique identifier is provided to a "User ID" field, and a "Submit" button is selected), the system may automatically determine the identity group that corresponds to the user object unique identifier, and create a new relationship record between the corresponding identity group and the inviting member's contact group website (i.e., the group website that was created in step 1). The relationship may have an attribute that identifies it as an invitation that was generated using contact list automation. In this way, if the invited member accepts the invitation, the system may both make the invited member's identity group a member of the inviting member's contact group website, and make the inviting member's identity group a member of the invited member's contact list. The default administrator group object is assigned for each of the groups created during a contact list automation function (e.g., the identity group for the active user that creates the object is the administrator group for the object). In a preferred embodiment, each user has only one contact group website.

Matching group automation may be implemented in two steps. First, when a matching group creation function is invoked (e.g., a "Create Group Website" page is accessed, various attributes relating to a group object are provided, and a "Submit" button is selected), the system may automatically create a group object, create a group website object, and establish the group object as a content member and an access member of the group object. Second, the user may invite a plurality of user objects to the group object created in step 1. Upon accepting the invitation, invited members gain access to the group website object and appear as content on the group website object. In a preferred embodiment, each user may have any number of group websites implemented using the matching group automation function.

New member automation may expedite the process of inviting an individual to a group when the individual does not have an associated user object. New member automation may be implemented by an administrator of group in two steps. First, when a new member creation function is invoked (e.g., a "Create New Member" page is accessed, various personal information attributes relating to a profile object are provided, a group object identifier to which the new member is to be invited is provided, and a "Submit" button is selected), the system may create a new user object and profile and invite this new user object to the identified group. In one embodiment, the new member function may implement the following steps: automatically create a user object, create an identity group object for the user object, establish the created identity group object as the administrator group for the user object, create a profile object, establish the associated user object as the created user object and the administrator group as the created identity group, and create an invitation between the identified group object and the created user object. In a preferred embodiment, if an email address is provided during the create new member function, an invitation may be emailed providing the user with a description of the group object, any group website objects to which the group object is a member, a unique identifier, and a password. If no email address is provided, the system may provide the active user with a unique identifier and password so that the active user can provide this information to the new member. In one embodiment, the system may allow the active user of the new member to serve as the administrator of the new member's user object until the new member authenticates using the created unique identifier and password.

A primary benefit of the present invention is that it enables searching across a plurality of different websites to which an authenticated user has access. For example, in a preferred embodiment the system may 1) determine the group objects of which the authenticated user is a member; 2) determine the group website objects to which the group objects determined in step 1 are access member objects; 3) determine the content member objects that are members of the group website objects determined in step 2; and 4) determine the profile objects that are associated with the content member objects determined in step 3. In this way, a user may create an address book wherein a majority of the contact information is managed by the person to whom the contact information relates.

In one embodiment, group website objects may be generated by the personal information server. For example, the personal information server may have a website that transmits code relating to an authentication screen. Upon establishing an authenticated user, the system may take a unique identifier associated with the authenticated user and store it as a session variable on the server, as a cookie that is transmitted as part of every request, or by other means. The system may then transmit code relating to a screen that identifies all of the group websites to which the authenticated user is an access group member.

Profile Objects

It is understood that more or less tiers may be used with associated changes in complexity, speed, and flexibility. For example, if each user is to have only one profile, then the profile tier may be removed and personal information may be provided in the user tier. Additionally, more tiers could be used in which group websites could become members of super-group websites, if such functionality was desired. It is also understood that the present invention may be implemented using a XML documents as objects and relationships, and implementing the rules as described above. It is similarly understood that the present invention may be implemented using a personal physical identifier in addition to or in lieu of username and password for authentication.

Although the present invention allows groups to invite users and group websites to invite groups, it is also possible to allow users to request membership to groups and groups to request membership to group websites in what is essentially an invitation acceptance process that is the reverse of the process described above. This reverse invitation acceptance scheme may be used in lieu of or in addition to the invitation acceptance scheme described more fully above.

In one embodiment, an additional characteristic of a group object and/or a group website object may be an automatic invitation and/or acceptance attribute. For example, a group object may have an attribute that indicates to the system that any time that it is invited to a group website object, the invitation is accepted. Similarly, a group website object may include an attribute that indicates that any authenticated user may create a relationship between the group website object and an object for which the authenticated user is a member of the administrative group object. For example, an authenticated user may visit a page that says "Join this mailing list." By selecting a profile and activating a control, such as a button, the system may automatically create a member relationship between the authenticated user's identity group object and the group website object associated with the mailing list.

In one embodiment, objects may have relationships between objects on the same tier. For example, a first profile object for a first user may have a relationship with a second profile object for a second user that identifies that the users associated with the first and second objects are brothers. In a preferred embodiment, these types of relationships may be implemented using an invitation acceptance scheme as disclosed above.

In one embodiment, the number of tiers of objects may be dynamically determined and modified to increase system efficiency or achieve other benefits. For example, the presently preferred four-tier architecture has many benefits of administration, but may place processing burdens and/or cause a degree of latency on some servers. Accordingly, the number of tiers may be flattened by caching a snapshot of current data and presenting this data until a predetermined condition is satisfied (e.g., a relationship and/or object attribute is changed, a predetermined period of time has passed, a request for refreshed data is received). For example, the first time a group website object is accessed (e.g., the first time that an authentication page for a group website object is accessed or the first time that a group website is displayed in accordance the attributes of and relationships to a group website object), the system may dynamically determine the members of the content and/or access members of the group website object. Additionally, the system may determine the profile objects that have been associated with the content members, and retrieve the content of said profile objects. Because this process of determining group members and retrieving profile object information may take time and may change infrequently, in one embodiment the object attribute and relationship data may be cached each time the data is retrieved from the personal information server.

It is similarly understood that the present invention may include portable hardware and/or software devices referred to as keys. The key may be required in addition to or in lieu of a username and password for authentication. Furthermore, the present invention may include a username, password, personal physical identifier (e.g., fingerprint, voice characteristics, and retinal pattern) and a key. Additionally, the present invention may be implemented using a key in conjunction with a personal physical identifier. An example of using a key with the present invention may be as follows: an apartment complex may have a number of tenants who need access to both the apartment complex and their particular unit. A first terminal device having access to a personal information server (e.g., wired or wireless Internet access) may be placed outside the apartment complex. The first terminal device may determine the unique identifier associated with a key. The first terminal device may then transmit this unique identifier to the personal information server, for example, and determine whether the unique identifier corresponds to a user object that is a member of an access member of a group website associated with the rental complex. If the unique identifier does correspond, access to the complex may be allowed. If the unique identifier does not correspond, access to the complex may be denied. If access is granted, the user may then proceed to a unit within the complex and interact with a second terminal device with the same key. The second terminal device may again determine the unique identifier associated with the key. The second terminal device may again transmit this unique identifier to the personal information server and determine whether the unique identifier corresponds to a user object that is a member of an access member of a group website associated with the unit. If the unique identifier does correspond, access to the unit may be allowed. If the unique identifier does not correspond, access to the unit may be denied.

In one embodiment, the present invention may simplify the process and increase the security of granting service providers access to a physical location, such as a home. For example, a homeowner may engage a service provider over the phone, Internet, or other method. The homeowner may invite the service provider's group object to a homeowner's home group website as an access member. Once the service provider accepted the invitation the service provider could access the user's home with the service provider's key. The homeowner could establish a time frame in which the service provider can have access (e.g., business hours, Monday to Wednesday, etc.). Additionally, after the engagement, the homeowner could remove the service provider's group object from the homeowner's group website, thereby preventing the service provider from gaining access after the engagement. In this way, access to a physical location may be controlled without transferred a physical key between the parties and without requiring either the service provider or the homeowner to divulge a password to the other party. Additionally, the service provider may control the membership of the service provider's group object in accordance with the present invention, thereby enabling a service provider to gain access to a physical location for all of the service provider's employees without providing any of the service employees with a key to the physical location.

Exemplary benefits of keys implemented in accordance with the present invention are that 1) a user may be granted access to a number of predetermined locations with a single key even when access to two or more of the locations is controlled by different entities (e.g., a user can use a single key to gain access to an apartment complex and a work place when the apartment complex and work place have made no coordination between each other); 2) access to a predetermined location can be monitored (e.g., the system may log when access was granted to the predetermined location and a user can monitor when his or her key has been used to gain access to different physical and/or virtual areas); and 3) access to a predetermined location can be made temporary and/or revoked.

In one embodiment, the present invention may be implemented with non-personal information groups that consist of and/or comprise non-personal information related objects. For example, a group may consist of and/or comprise documents (including XML documents), text, hyperlinks, binary files (e.g., drawing, video and music files), and other content. In a preferred embodiment, a non-personal information group may be implemented in a manner similar to a group object described above. For example, it may have an administrator group object, and this administrator group object may be able to add or remove objects from the group and accept invitations on behalf of the group (e.g., invitations to become a content member of a group website).

In one embodiment, information provided by the present invention may be cached on a personal digital assistant, desktop computer, phone, and/or other terminal device. In one embodiment, this functionality may be implemented by interfacing with other personal information management systems, such as Microsoft Outlook. For example, the present invention may be used to directly provide data to an Outlook client (e.g., a synchronization function activated when a synchronize function is selected from a menu). In one embodiment, a user may have an option to accept or reject all changes that are suggested by the synchronization function.

In one embodiment, the present invention may be implemented in accordance with the Active Server Pages (ASP) and Access database provided with the present application. Specifically, by posting the ASP pages and Access database to a web server (e.g., Internet Information Server or Personal Web Server) and creating an ODBC connection to the database, an implementation of the present invention may be viewed. This implementation is an instance of a personal information web server, which in one embodiment is the hardware, software, data, and telecommunications assets that together accomplish the objectives of the present invention. It is understood that these web pages do not implement all of the claimed functionality of the present invention and is not intended to limit the scope of the invention. For example, there is no profile tier in the provided ASP pages, and the access and content groups are implemented using a related but different methodology (e.g., much of the desired functionality is hard-coded into the ASP pages and Access database, whereas the present invention enables similar functionality without modifying the ASP pages or the Access database, once they are configured properly). It is also understood that there is at least one technical shortcomings that could be addressed using conventional programming techniques. For example, the fact that the ASP pages work best with Internet Explorer 5.0 and work poorly with all versions of Netscape Navigator is a problem that is understood and is not intended to be read into the scope of the invention as claimed and described. These pages are included herein by reference.

What is claimed is:

1. A computer-implemented system for managing personal information comprising:
   a group website tier comprising a plurality of group website objects;
   a group tier comprising a plurality of group objects;
   a user tier comprising a plurality of user objects;
   a first set of relationships that define relationships between the group website objects and the group objects, wherein the first set of relationships comprises:
      a first type of relationships that define which group objects have access to each of the plurality of group website objects; and
      a second type of relationships that define which group objects appear as content for each of the plurality of group website objects; and
   a second set of relationships that define relationships between the group objects and the user objects.

2. The system of claim 1, wherein the second set of relationships comprises a third type of relationship that defines which user objects are members of each of the plurality of group objects.

3. The system of claim 2, wherein each of the objects comprises an administrator group object attribute that determines an administrator group object that has rights to modify relationships and attributes associated with the object.

4. The system of claim 3, further comprising a profile tier comprising a plurality of profile objects, wherein each of the profile objects comprises:
   an associated user object attribute that determines with which user object a profile object is associated;
   an administrator group object attribute that determines an administrator group object that has rights to modify relationships and attributes associated with the object; and
   a plurality of personal information attributes.

5. The system of claim 1, further comprising:
   a profile tier comprising a plurality of profile objects, wherein each of the profile objects comprises an associated user object attribute, an administrator group object attribute, and a plurality of personal information attributes.

6. The system of claim 5, wherein the system is configured to dynamically determine access rights to information in the profile tier based on:
   a first set of groups to which the active user is a member;
   a set of group websites to which the first set of groups has access;
   a second set of groups that are content members of the set of group websites; and
   a set of profiles which are associated with the second set of groups, wherein the active user has access rights to the set of profiles.

7. The system of claim 1, wherein the first set of relationships defines a many to many relationship between group tier and group website tier.

8. The system of claim 1, wherein each of the plurality of database records comprises a group website identifier, a group identifier, and a relationship type such that a first collection of relationships comprise access relationships and a second collection of relationships comprise content relationships.

9. The system of claim 1, wherein:
   a first group is an access member of a first group website and a second group is a content member of the first group website; and
   the system is configured to grant access to the first website to members of the first group and deny access to the first group website to members of the second group, and to present only those profiles associated with the second group.

10. The system of claim 1, wherein:
    an active user has rights to create a collection of group website objects and a collection of group objects, wherein objects created by the active user are referred to collectively as the created objects;
    the active user has rights to designate an administrative group for each of the created objects;
    the active user has rights to establish relationships between any two objects for which the active user has administrative rights;
    the active user does not have rights to establish relationships between any two objects wherein the active user does not have administrative rights over at least one of the two objects; and
    the active user has rights to establish an invitation between a first object for which the active user has administrative rights and a second object for which the active user does not have administrative rights, wherein a second user that has administrative rights over the second object has rights to accept the invitation.

11. The system of claim 10, further comprising a relationship manager configured to create the first and second set of relationships and further configured to determine an active user's administrative rights.

12. The system of claim 11, wherein the relationship manager is configured to create the second set of relationships by:
    generating an invitation to join a group based on input from a user having administrative rights over the group; and
    creating a relationship when the invitation is selectively accepted by an invited user, wherein said relationship comprises a profile object identifier.

13. The system of claim 11, wherein the relationship manager is configured to create the second set of relationships by:
- generating a request to join a group based on input from a requesting user; and
- creating a relationship when the request is selectively accepted by a user having administrative rights over the group.

14. The system of claim 11, wherein the relationship manager is configured to create the first set of relationships by:
- determining administrative rights to a group website object and a group object;
- enabling an active user to add a group object to a group website object when the active user has administrative rights over the group object and the group website object;
- enabling an active user to invite a group object to a group website object when the active user has administrative rights over the group website object and does not have administrative rights over the group object; and
- enabling an active user to request group membership to a group website object when the the active user has administrative rights over the group object and does not have administrative rights over the group website object.

15. The system of claim 1, wherein at least one of the user objects comprises a first password having a first set of rights and a second password having a second set of rights.

* * * * *